United States Patent [19]

Labaze

[11] Patent Number: 5,640,297
[45] Date of Patent: Jun. 17, 1997

[54] AIRLINE SEAT BACK COMPUTER FOR PROVIDING TRAVEL INFORMATION

[76] Inventor: Ducarmel Labaze, 21B Hoffman St., Spring Valley, N.Y. 10977

[21] Appl. No.: 546,696

[22] Filed: Oct. 23, 1995

[51] Int. Cl.6 .............................. G06F 1/16; G08G 1/123; E06B 9/00; H05K 7/00
[52] U.S. Cl. .................... 361/683; 361/681; 340/995; 160/26; 160/127
[58] Field of Search .............................. 264/708.1, 449; 348/113, 117; 340/990, 995, 971; 160/23.1, 26, 31, 33, 271, 272, 273.1, 127; 361/680–686

[56] References Cited

U.S. PATENT DOCUMENTS

| | | | |
|---|---|---|---|
| 4,756,528 | 7/1988 | Umashankar | 463/1 |
| 4,897,714 | 1/1990 | Ichise et al. | 348/117 X |
| 5,214,757 | 5/1993 | Mauney et al. | 340/990 X |
| 5,264,765 | 11/1993 | Pecorino et al. | 160/23.1 |
| 5,568,390 | 10/1996 | Hirota et al. | 364/449 |

Primary Examiner—Michael W. Phillips

[57] ABSTRACT

An informative entertainment system for travelers including a computer enclosure installable into a rear face of a passenger seat. An interactive computer system is situated within the computer enclosure and comprises a liquid crystal display screen positioned on a front face thereof. Software is installed in the computer system and adapted to coincidently display information pertinent to regions, cities, and other areas of concern along a specific route of travel as the traveler is in the proximity thereof. The software is further adapted to allow interaction with the traveler. Also included is a shutter enclosure positioned in the proximity of the computer enclosure with flexible shutter disposed therein. The shutter has a first orientation for precluding access to the computer system and a second orientation for allowing access to the computer system.

1 Claim, 2 Drawing Sheets

AIRLINE SEAT BACK COMPUTER FOR PROVIDING TRAVEL INFORMATION

BACKGROUND OF THE INVENTION

1. Field of the Invention

The present invention relates to a new and improved informative entertainment system for travelers and, more particularly, pertains to providing travelers with informative entertainment pertaining to the regions, cities, and other concerns in the proximity of the route of travel.

2. Description of the Prior Art

The use of entertainment systems for travelers is known in the prior art. More specifically, entertainment systems for travelers heretofore devised and utilized for providing travelers with entertainment are known to consist basically of familiar, expected, and obvious structural configurations, notwithstanding the myriad of designs encompassed by the crowded prior art which has been developed for the fulfillment of countless objectives and requirements.

The prior art discloses a large number of entertainment systems for travelers. By way of example, U.S. Pat. No. Des. 281,940 to Steventon et al. discloses the ornamental design for an airline passenger seat combined LCD and battery pack unit for an entertainment and information system. U.S. Pat. No. Des. 340,235 to Robak et al. discloses the ornamental design for a pop-up monitor display unit for a seat in the passenger compartment of an aircraft, as shown and described. Finally, U.S. Pat. No. 5,179,519 to Adachi et al. discloses a navigation system for a vehicle comprising a GPS receiver, a display unit, a map memory in which a map is stored, as well as display means.

In this respect, the informative entertainment system for travelers according to the present invention substantially departs from the conventional concepts and designs of the prior art, and in doing so provides an apparatus primarily developed for the purpose of providing travelers with informative entertainment pertaining to the regions, cities, and other concerns in the proximity of the route of travel.

Therefore, it can be appreciated that there exists a continuing need for a new and improved informative entertainment system for travelers which can be used for providing travelers with informative entertainment pertaining to the regions, cities, and other concerns in the proximity of the route of travel. In this regard, the present invention substantially fulfills this need.

SUMMARY OF THE INVENTION

In view of the foregoing disadvantages inherent in the known types of entertainment systems for travelers now present in the prior art, the present invention provides an improved informative entertainment system for travelers. As such, the general purpose of the present invention, which will be described subsequently in greater detail, is to provide a new and improved informative entertainment system for travelers and methods which have all the advantages of the prior art and none of the disadvantages.

To attain this, the present invention essentially comprises a computer enclosure including a rear wall with an outwardly extending periphery including a top wall, bottom wall, and a pair of opposed side walls defining an interior space with an open front face. Each of the opposed sidewalls have an inwardly facing channel disposed along an outer edge thereof. A shutter enclosure is coupled to the periphery of the computer enclosure. The shutter enclosure has a slit formed along the length thereof adjacent the channels of the computer enclosure. An elongated rod is coupled between two opposed side walls of the shutter enclosure and centrally disposed therebetween. A hollow sleeve is disposed about the elongated rod and is capable of rotating thereon. A flexible shutter is wrappedly disposed about the sleeve and coupled thereto lengthwise along an end thereof. The shutter is further disposed through the slit and slidably situated between the channels. A helical spring is positioned within the space of the sleeve and has an unbiased orientation in which the shutter is entirely wrapped about the sleeve and a biased orientation in which the shutter is entirely disposed about the front face of the computer enclosure.

An interactive computer system is situated within the computer enclosure and comprises a liquid crystal display screen positioned on a front face thereof. The computer system includes a keyboard and a tracking ball for allowing the traveler to interact with the system. Software is installed in the computer system and is adapted to coincidently display information pertinent to regions, cities, and other areas of concern along a specific route of travel as the traveler is in the proximity thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved informative entertainment system for travelers which has all the advantages of the prior art entertainment systems for travelers.

It is another object of the present invention to provide a new and improved informative entertainment system for travelers which may be easily and efficiently manufactured and marketed.

It is a further object of the present invention to provide a new and improved informative entertainment system for travelers which is of a durable and reliable construction.

An even further object of the present invention is to provide a new and improved informative entertainment system for travelers which is susceptible of a low cost of manufacture with regard to both materials and labor, and which accordingly is then susceptible of low prices of sale to the consuming public, thereby making such informative entertainment system for travelers economically available to the buying public.

Still yet another object of the present invention is to provide a new and improved informative entertainment system for travelers which provides in the apparatuses and methods of the prior art some of the advantages thereof, while simultaneously overcoming some of the disadvantages normally associated therewith.

Even still another object of the present invention is to provide a informative entertainment system for travelers which provides providing travelers with informative entertainment pertaining to the regions, cities, and other areas of concern on route of the traveler.

Lastly, it is an object of the present invention to provide an informative entertainment system for travelers including a computer enclosure installable into a rear face of a passenger seat. An interactive computer system is situated within the computer enclosure and comprises a liquid crystal display screen positioned on a front face thereof. Software is installed in the computer system and adapted to coincidently display information pertinent to regions, cities, and other areas of concern along a specific route of travel as the traveler is in the proximity thereof. The software is further adapted to allow interaction with the traveler. Also included is a shutter enclosure positioned in the proximity of the computer enclosure with flexible shutter disposed therein. The shutter has a first orientation for precluding access to the computer system and a second orientation for allowing access to the computer system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
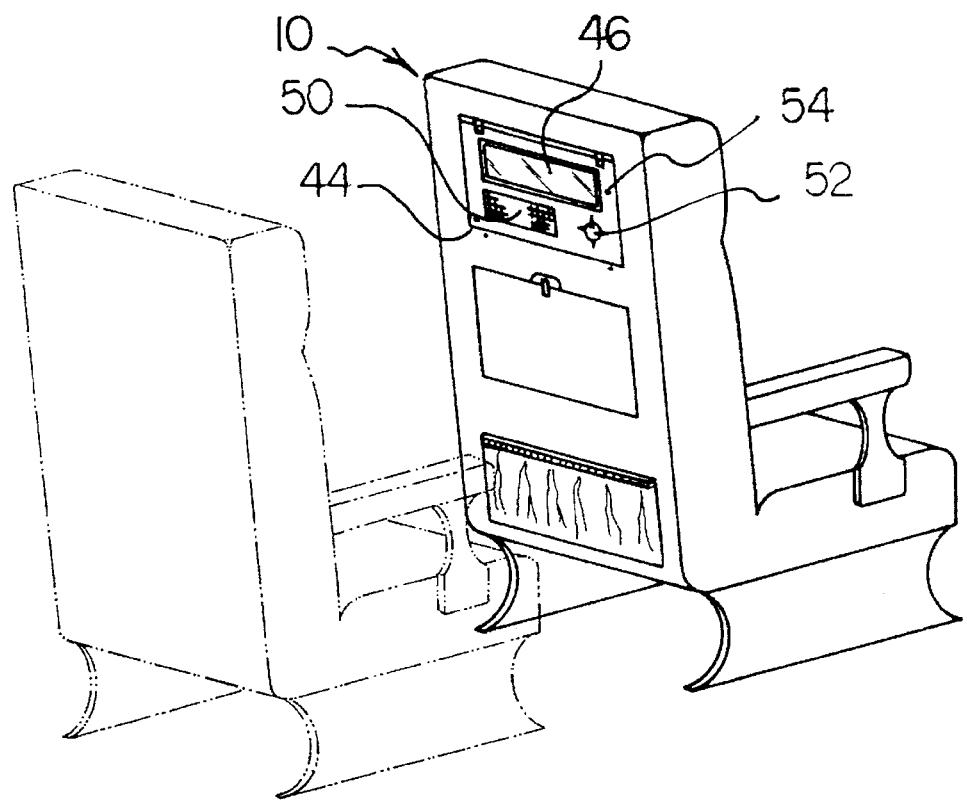
FIG. 1 is a perspective illustration of the preferred embodiment of the informative entertainment system for travelers constructed in accordance with the principles of the present invention.
Figure 2:
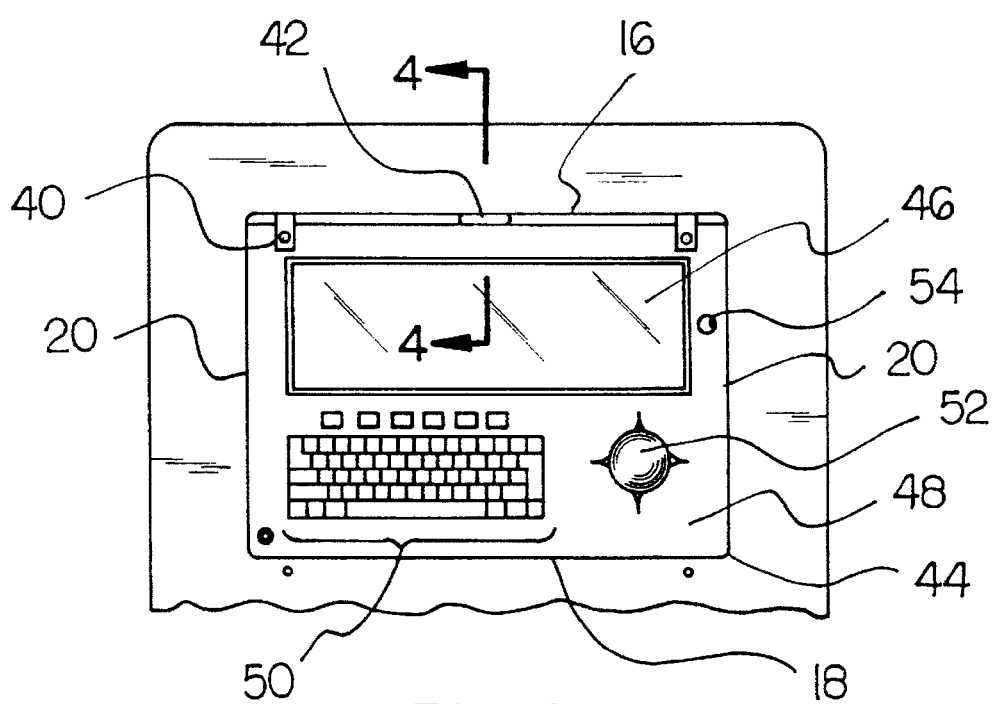
FIG. 2 is a plan front view of the informative entertainment system for travelers.
Figure 3:
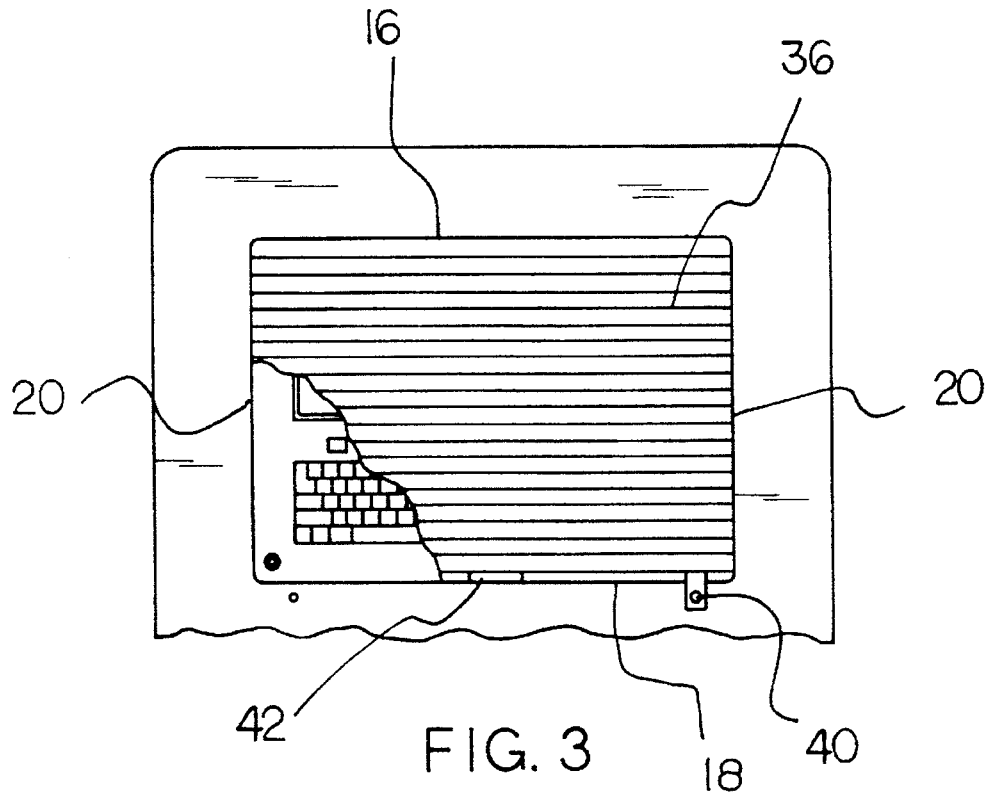
FIG. 3 is a plan front view of the informative entertainment system for travelers with the shutter in a closed orientation.
Figure 4:
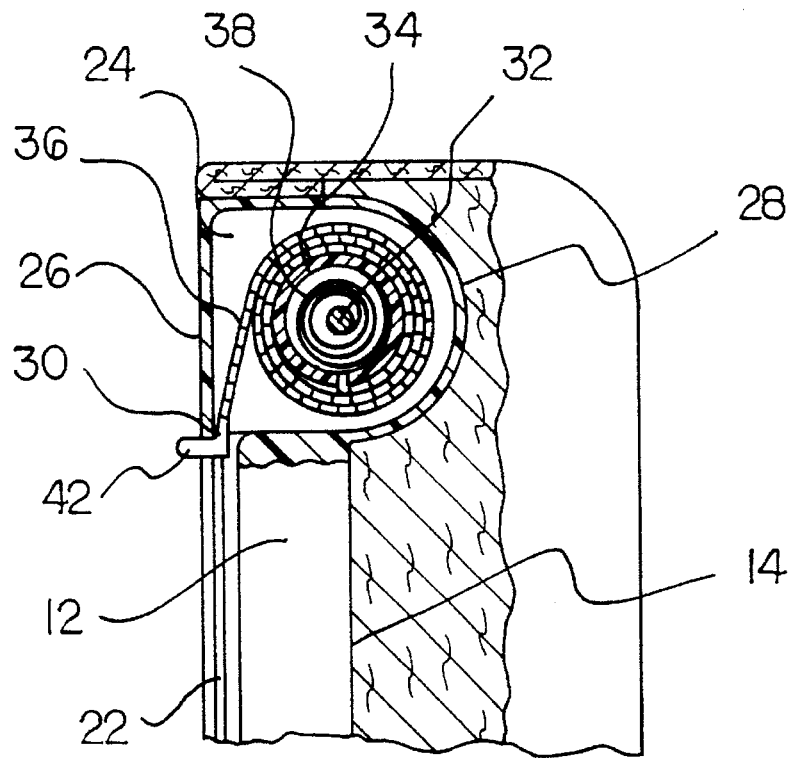
FIG. 4 is cross-sectional view taken along the line labeled 4—4 in FIG. 2.

With reference now to the drawings, and in particular to FIG. 1 thereof, the preferred embodiment of the new and improved informative entertainment system for travelers embodying the principles and concepts of the present invention and generally designated by the reference numeral 10 will be described.

The present invention, the new and improved informative entertainment system for travelers is a system 10 comprised of a plurality of components. In their broadest context, the components include a shutter enclosure, computer enclosure, and computer system. Each of the individual components is specifically configured and correlated one with respect to the other so as to attain the desired objectives.

More specifically, the system 10 of the present invention includes a computer enclosure 12 insertable in a rear face of a passenger seat. The computer enclosure comprises a rear wall 14 with a corresponding length and a corresponding width. The rear wall 14 further has an outwardly extending periphery including a top wall 16, bottom wall 18, and a pair of opposed side walls 20 defining an interior space with an open front face. Each of the opposed sidewalls 20 has an inwardly facing channel 22 disposed along an outer edge thereof.

A shutter enclosure 24 is coupled to the periphery of the computer enclosure and comprises a planar front wall 26 and an arcuate rear wall 28 with a length similar to that of the rear wall 14 of the computer enclosure. The shutter enclosure further comprises a periphery including a top wall, bottom wall, and a pair of opposed side walls coupled between the front and rear wall of the shutter enclosure. Such a construction thereby defining a closed interior space. The shutter enclosure further has a slit 30 formed along the length thereof adjacent the channels of the computer enclosure.

An elongated rod 32 is coupled between the opposed side walls of the shutter enclosure and centrally disposed therebetween.

A hollow sleeve 34 is disposed about the elongated rod 32 and capable of rotating thereon. The sleeve is significantly larger than the rod thereby defining a space therein.

A flexible shutter 36 is wrappedly disposed about the sleeve 34 and coupled thereto lengthwise along an end thereof. The shutter is further disposed through the slit and slidably situated between the channels.

A helical spring 38 is positioned within space of the sleeve and comprises a first end connected to the rod and a second end connected to the sleeve. The spring has an unbiased orientation in which the shutter is entirely wrapped about the sleeve and a further has a biased orientation in which the shutter is entirely disposed about the front face of the computer enclosure.

A coupling mechanism 40 is also included for allowing the shutter to remain disposed about the open front face of the computer enclosure. Such a coupling means preferably consists of a pair of snaps or a pile-type fastener.

A stopping means 42 is coupled to the shutter for precluding the shutter from sliding entirely within the shutter enclosure. Preferably, a bottom edge of the shutter is lined with a rodlike handle coupled lengthwise thereto. The rodlike handle has a width that is larger than the slit of the shutter enclosure.

Further included is an interactive computer system 44 situated within the computer enclosure and comprising a liquid crystal display screen 46 positioned on a front face 48 thereof. The computer system also includes a keyboard 50 and a tracking ball 52 for allowing the traveler to interact with the system. Technology employed in the computer system is commonly known and commercially available.

An actuator switch 54 is disposed on the front face 48 of the computer system and has an engaged orientation for activating the computer system and a disengaged orientation for the deactivation thereof.

Also included is software adapted to coincidently display, via the LCD screen, information pertinent to regions, cities, and other areas of concern along a specific route of travel. Such information is adapted to be displayed as the traveler is in the proximity the particular area of concern as to add to the novelty of the device. The software is further adapted to allow interaction with traveler.

The software may be constructed using a variety of methods for allowing the invention to display information relevant to a specific area of concern along a route of travel coincident and corresponding with the traveler's current disposition. In the preferred embodiment, the software is coupled to a standard GPS system. The software is adapted to receive geographical coordinates from the GPS and display specific information corresponding to the coordinate received.

The informative entertainment system allows the traveler to disengage the coupling means effecting the shutter to entirely wrap about the sleeve. The computer system is then activated via the actuator switch thereby providing the traveler with interactive entertainment and information pertinent to a significant region, city, or attraction in the proximity of the traveler. The computer may further be deactivated and the shutter may be slid over the open face after use.

The present invention offers an informative entertainment system which provides a traveler with a unique plethora of information specifically relevant to the travelers current route of travel. The displayed information coincidently corresponds to the travelers disposition along the particular route of travel. Such a feature allows the travelers to observe the area of concern simultaneously as the information is displayed thereby providing enjoyment to the traveler. The informative entertainment system would be ideal for any proprietor of any travel medium including aircraft, trains, and boats.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved inboard computer system for travelers disposed on a rear face of a seat for informing and entertaining a traveler in a transportation medium such as a plane, train, or bus comprising, in combination:

a computer enclosure comprising a rear wall with a corresponding length and a corresponding width, the rear wall further having an outwardly extending periphery including a top wall, bottom wall, and a pair of opposed side walls defining an interior space with an open front face, each of the opposed sidewalls having an inwardly facing channel disposed along an outer edge thereof;

a shutter enclosure coupled to the periphery of the computer enclosure and comprising of a planar front wall and an arcuate rear wall with a length similar to that of the rear wall of the computer enclosure, the shutter enclosure further comprising a periphery including a top wall, bottom wall, and a pair of opposed side walls coupled between the front and rear wall of the shutter enclosure thereby defining a closed interior space, the shutter enclosure further having a slit formed along the length thereof adjacent the channels of the computer enclosure;

an elongated rod coupled between the opposed side walls of the shutter enclosure and centrally disposed therebetween;

a hollow sleeve disposed about the elongated rod and capable of rotating thereon, the sleeve significantly larger than the rod as to define a space therein;

a flexible shutter wrappedly disposed about the sleeve and coupled thereto lengthwise along an end thereof; the shutter further disposed through the slit and slidably situated between the channels;

a helical spring positioned within space of the sleeve and comprising a first end connected to the rod and a second end connected to the sleeve, the spring having an unbiased orientation which the shutter is entirely wrapped about the sleeve and a biased orientation which the shutter is entirely disposed about the front face of the computer enclosure;

a coupling mechanism allowing the shutter to remain disposed about the open front face of the computer enclosure;

a stopping means coupled to the shutter for precluding the shutter from sliding entirely within the shutter enclosure;

an interactive computer system situated within the computer enclosure and comprising a liquid crystal display screen positioned on a front face thereof, the computer system further including a keyboard and a tracking ball for allowing the traveler to interact with the system;

an actuator switch disposed on the front face of the computer system having an engaged orientation for activating the computer system and a disengaged orientation for the deactivation thereof; and software adapted to coincidently display information pertinent to regions, cities, and other areas of concern along a specific route of travel as the traveler is in the proximity thereof, the software further adapted to allow interaction with traveler;

whereby the traveler may disengage the coupling means effecting the shutter to entirely wrap about the sleeve and activate the computer system thereby providing interactive entertainment and information pertinent to a significant region, city, or attraction in the proximity of the traveler, the computer may further be deactivated and the shutter may be slid over the open face after use.

* * * * *